United States Patent
Pecci

[15] 3,676,719
[45] July 11, 1972

[54] ELECTROMAGNETIC MOTOR WITH PLURAL RECIPROCATING MEMBERS

[72] Inventor: Angelo A. Pecci, 1 Sixth Street, Clifton, N.J. 07011

[22] Filed: July 22, 1971

[21] Appl. No.: 165,228

[52] U.S. Cl. .............................................. 310/24, 310/35
[51] Int. Cl. ........................................................ H02k 7/06
[58] Field of Search ................... 310/23, 24, 35, 34, 30, 83

[56] References Cited

UNITED STATES PATENTS

| 130,385 | 8/1872 | McClure | 310/24 |
| 538,351 | 4/1895 | Sabin | 310/24 |
| 1,349,100 | 8/1920 | Reynolds | 310/24 |
| 1,356,290 | 10/1920 | Kellum | 310/24 X |
| 1,886,040 | 11/1932 | Moodyman | 310/24 |
| 2,338,005 | 12/1943 | Morcy | 310/24 |
| 2,486,948 | 11/1949 | Hinchman | 310/34 |
| 3,328,656 | 6/1967 | Dotson | 310/24 X |

Primary Examiner—D. F. Duggan
Attorney—A. Yates Dowell et al.

[57] ABSTRACT

Apparatus for converting electrical energy into rotary motion for performing work, such as driving a wheeled vehicle. The apparatus includes a plurality of electromagnetic solenoids with the core of each solenoid being eccentrically connected to a driving gear which meshes with a driven gear carried by a drive shaft to gain a mechanical advantage and cause rotation of the drive shaft. The solenoids are energized sequentially to cause continuous rotation of the drive shaft.

5 Claims, 5 Drawing Figures

INVENTOR
ANGELO A. PECCI

INVENTOR
ANGELO A. PECCI

ELECTROMAGNETIC MOTOR WITH PLURAL RECIPROCATING MEMBERS

BACKGROUND OF THE INVENTION

1. Field of the Invention

This invention relates generally to power plants of various kinds and relates particularly to electromechanical structures for converting electrical energy into rotary motion for performing work.

2. Description of the Prior Art

Heretofore many power plants have been provided including electromagnetic power plants having a crankshaft with a plurality of cranks thereon and with a plurality of solenoids each of which is connected to a separate crank in such a manner that sequential operation of the solenoids will cause rotation of the crankshaft. Examples of this type of motor are disclosed by the patents to Reynolds et al., U.S. Pat. No. 1,349,100; Moodyman U.S. Pat. No. 1,886,040; and Morch U.S. Pat. No. 2,338,005. In this type of structure the cores of the solenoids drive the crankshaft directly.

SUMMARY OF THE INVENTION

The present invention is an electromagnetic motor having a plurality of solenoids preferably mounted in alignment with each other. Each of the solenoids is provided with a core pivotally connected to one end of a link and the opposite end of such link is pivotally and eccentrically connected to a drive gear carried by a stub shaft. Each of the drive gears meshes with a driven gear mounted on a drive shaft having a fly wheel fixed thereto. A timing mechanism is provided which is synchronized with the rotation of the drive gear and is adapted to sequentially energize the solenoids for causing rotation of the drive shaft. A pulley or sprocket is mounted on the drive shaft and is adapted to drive a generator or alternator by means of a drive belt and such generator or alternator generates electrical energy which can be stored in one or more storage batteries and such batteries in turn supply energy to the solenoids.

DESCRIPTION OF THE PREFERRED EMBODIMENT

Figure 1:
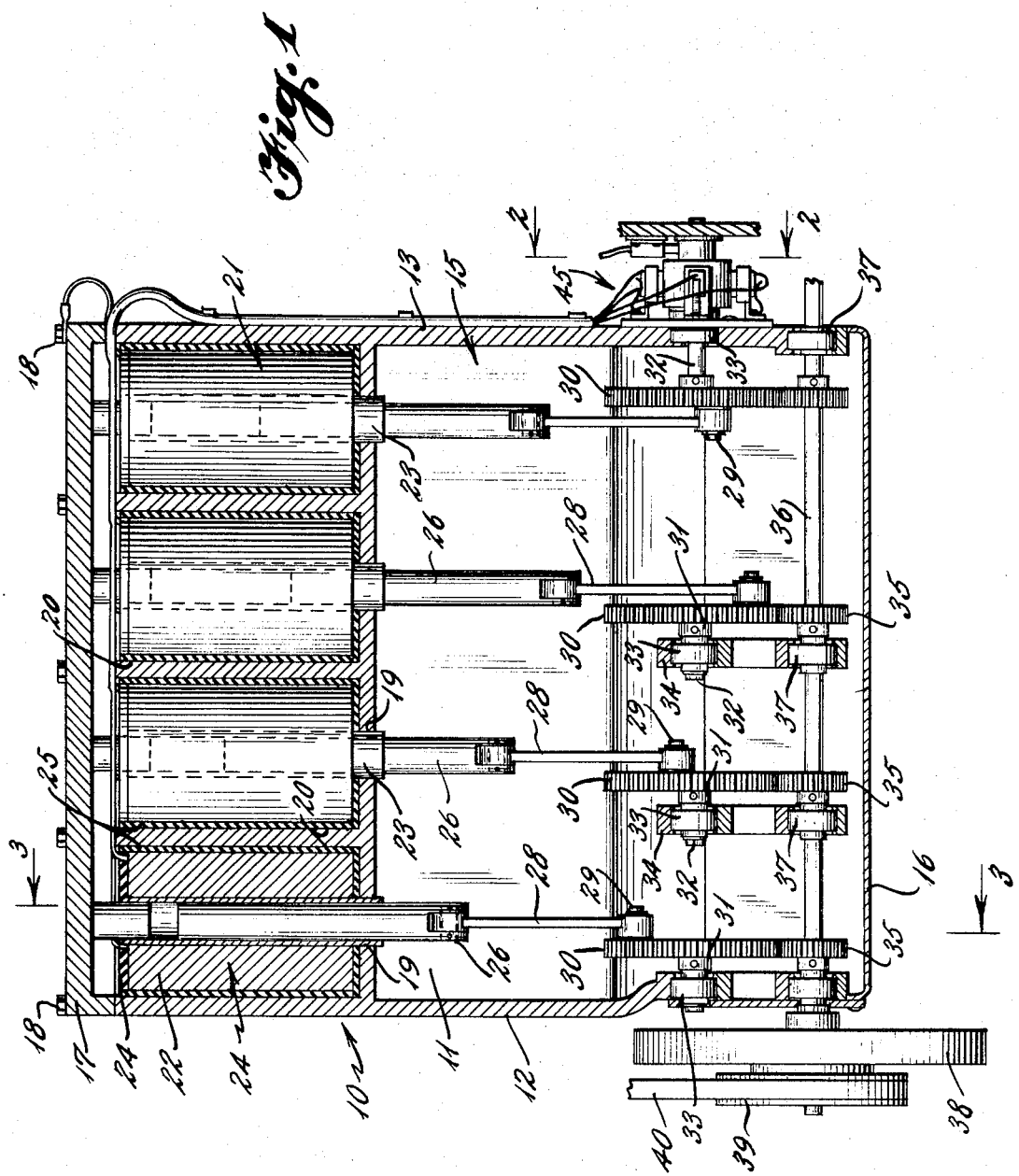
FIG. 1 is a section of an electromagnetic motor illustrating one application of the invention.

With continued reference to the drawings, a body 10 is provided having side walls 11, and front and rear walls 12 and 13, respectively. A motor block 14 fills the upper portion of the body 10 and the lower portion thereof is hollow and defines a compartment 15. A pan 16 is attached to the body 10 to provide a bottom wall for the compartment 15 to protect the apparatus within such compartment. A removable head 17 is mounted on top of the body 10 by means of bolts or other fasteners 18 to provide access to the upper portion of the block 14.

The block 14 is provided with a series of bores 19 and concentric counterbores 20 which preferably are located along generally vertical axes substantially in side-by-side relationship with each other. An electromagnetic solenoid 21 is located within each of the counterbores 20 and each of such solenoids includes a coil 22 disposed about an inner sleeve 23. Each of the solenoids is provided with electromagnetic insulating end walls 24 connected by an electromagnetic insulating jacket 25 within which the coil 22 is located. The inner sleeve 23 of each of the solenoids extends through one of the bores 19 into the hollow compartment 15 and each of such sleeves slidably receives a core 26 of ferrous metal. The lower end of each of the cores 26 is bifurcated and is provided with a pivot 27 which swingably connects one end of a link 28 to the core 26. The opposite end of the link 28 is pivotally connected to a pin 29 eccentrically mounted on a spur-type drive gear 30.

Each of the drive gears 30 is provided with a hub 31 mounted on a stub shaft 32 rotatably supported in bearings 33 carried by the body 10. As illustrated in FIG. 1, the bearing 33 of the first solenoid is mounted in the front wall 12 of the body, the bearings for the second and third solenoids are mounted in bridges 34 which span the compartment 15, and the bearing for the rear solenoid is mounted in the rear wall 13. Such stub shafts 32 are mounted along a common axis of rotation.

Each of the drive gears 30 meshes with a pinion-type driven gear 35 and such driven gears are mounted on a common drive shaft 36 supported by bearings 37. The drive shaft 36 extends through the front and rear walls 13 and a fly wheel 38 is mounted on such drive shaft adjacent to the front wall 12. If desired additional fly wheels and counterweights can be mounted exteriorly of the rear wall 15 and along the shaft 36 both inside and outside of the body 10.

A drive pulley or sprocket 39 is mounted on the drive shaft 36 adjacent to the fly wheel 38 and such pulley drives a belt or chain 40 for a purpose which will be described later.

In order to time the solenoids 21 so that they operate in sequence, the rearmost stub shaft 32 extends through the rear wall 13 and a distributor 45 is mounted on the outwardly extending portion thereof. The distributor 45 includes a sleeve 46 of electrical insulating material fixed to the stub shaft 32 and an electrical contact sleeve 47 is mounted in fixed position on the insulating sleeve 46. One end of the contact sleeve 47 is engaged by a copper, carbon brush or the like No. 48 maintained in intimate engagement with the sleeve by a spring 49 contained within a housing 50. Electrical energy is supplied to the brush 48 through an electric cable 51 from a source of electrical energy such as a 48-volt battery 52 or the like. At the opposite end of the electrical contact sleeve 47, a commutator 53 is mounted in fixed position so that the commutator will rotate when the stub shaft 32 rotates.

Figure 2:
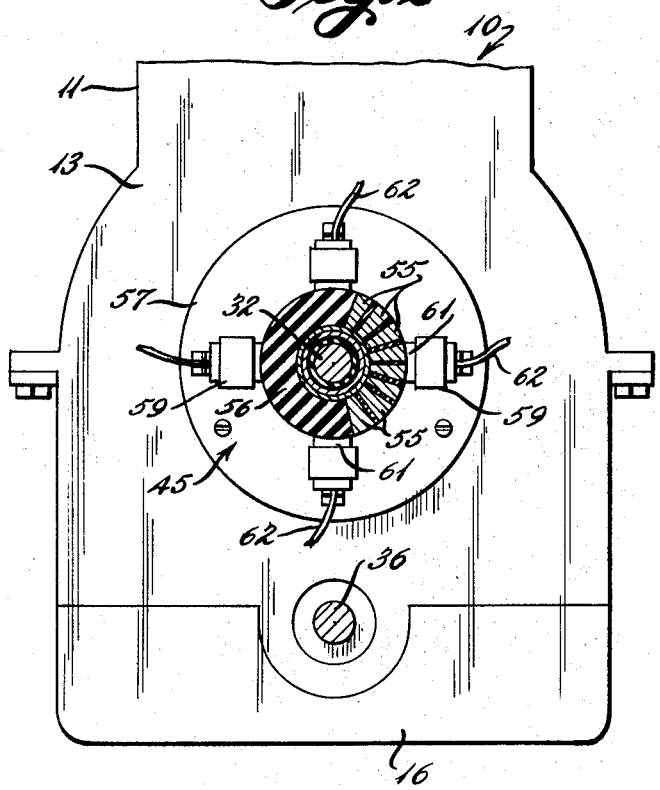
FIG. 2 is an enlarged section on the line 2—2 of FIG. 1.
Figure 3:
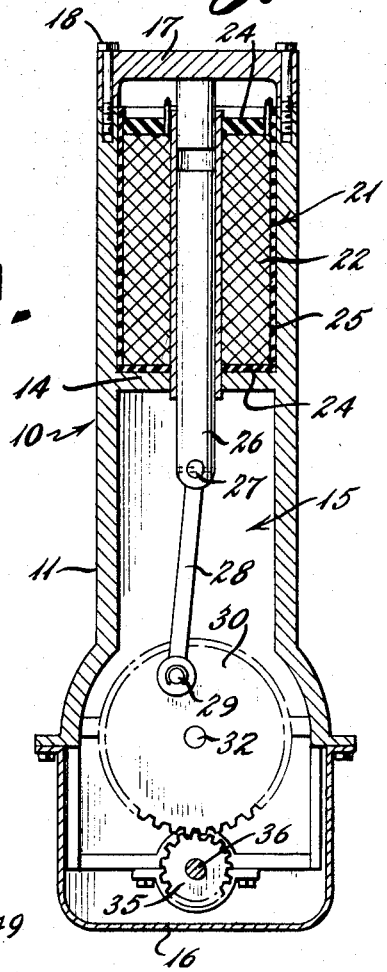
FIG. 3 is a section on the line 3—3 of FIG. 1.

As illustrated in FIG. 2, the commutator includes an inner sleeve 54 of electricity conducting material disposed in contact with the sleeve 47. A plurality of segmental wedge-shaped metallic elements 55 have one end in contact with the inner sleeve 54 and the opposite end exposed at the outer periphery of the commutator. The wedge-shaped elements 55 extend around the sleeve 54 less than one-half of the circumference and if desired such wedge-shaped elements may be separated from each other by strips of electrical insulating material. The remainder or the main portion of the commutator body is constructed of electrical insulating material 56.

Figure 4:
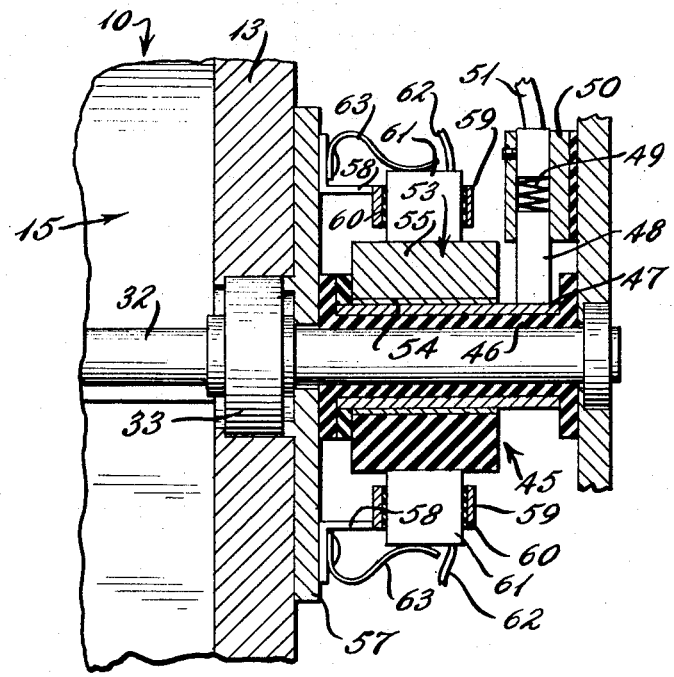
FIG. 4 is an enlarged section of the distributor.

As illustrated best in FIG. 4, a base plate 57 is mounted on the rear wall 13 of the body 10 and such base plate 57 is provided with a plurality of brackets 58 spaced about the periphery of the commutator 53 with one bracket being provided for each of the solenoids 21. Each of the brackets includes a housing 59 having an interior liner 60 of electrical insulating material within which a carbon brush 61 is slidably mounted. Each of the brushes 61 is connected by an electric line 62 to a corresponding solenoid 21. Preferably a leaf spring 63 is mounted on the base plate 57 and bears against the top of the carbon brush 61 to maintain the brush in intimate engagement with the commutator 53.

Figure 5:
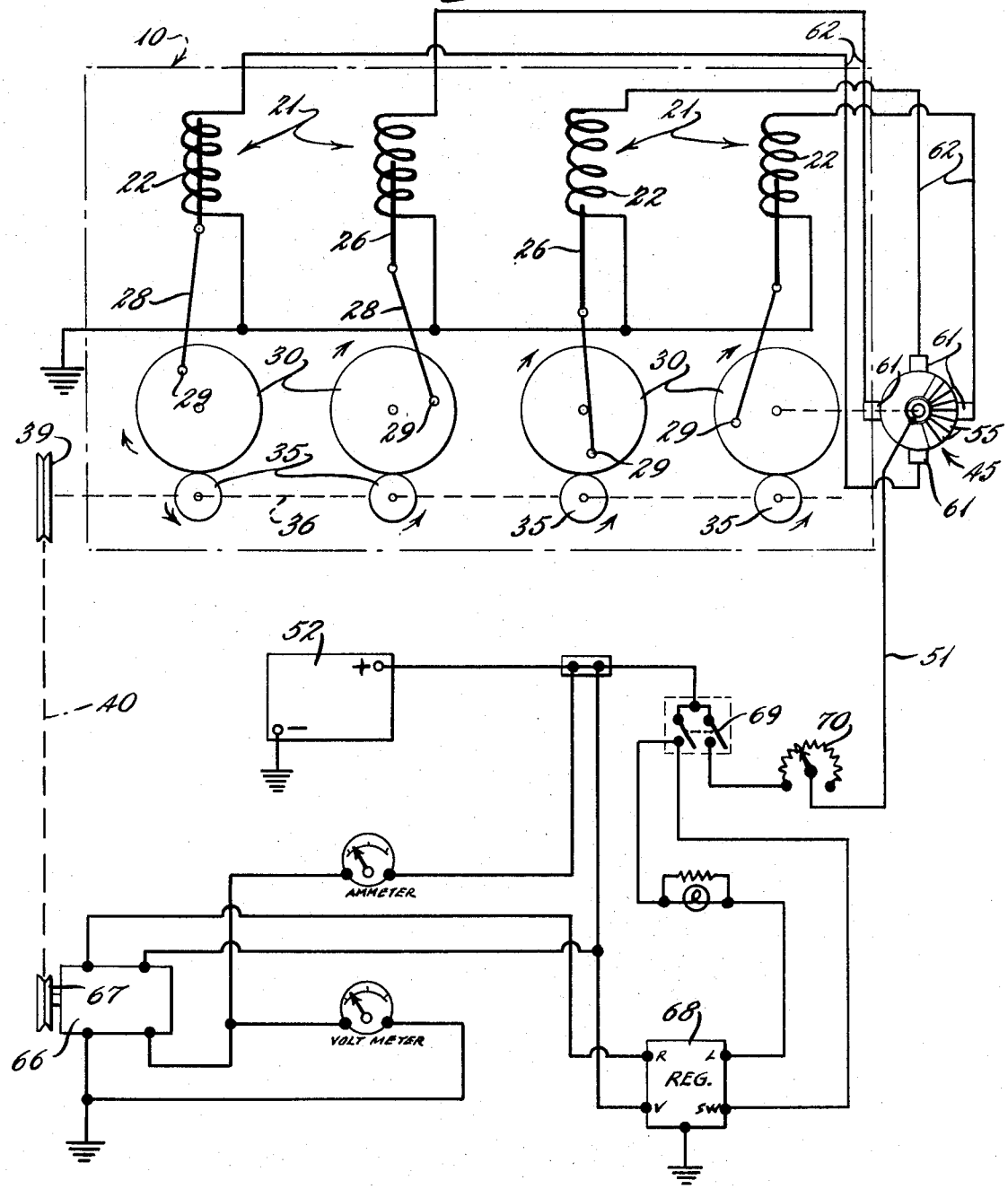
FIG. 5 is a schematic wiring diagram.

With reference to FIG. 5, an electricity generating unit 66, such as a generator or alternator, is provided having a pulley or sprocket 67 engaged by the belt 40 so that rotation of the drive shaft 36 will operate the generating unit 66. Such unit generates electrical energy and transmits such electrical energy through a voltage regulator 68 to the battery 52 to at least partially replenish the energy stored in the battery. A switch 69 is provided for making and breaking the flow of energy to the distributor 45 and if desired a variable rheostat 70 is provided for controlling such flow of energy and thereby controlling the speed of rotation of the drive shaft 36.

In the operation of the device, the distributor 45 is timed so that as soon as each of the drive gears 30 moves its associated pin 29 past bottom dead center, the corresponding carbon brush 61 will engage the wedge-shaped elements 55 of the commutator so that electrical energy will flow to the associated solenoid 21. When the solenoid is excited, the core 26 will be drawn into the sleeve 23 by electromagnetic attraction and will exert a pulling force on the link 28 to cause the drive gear 30 to rotate. When the pin 29 approaches top dead center, the solenoid will be de-energized by moving out of engagement with the corresponding carbon brush 61. When four solenoids are used, as illustrated, two solenoids are exerting an upward pull most of the time, while the other two solenoids are not energized and the drive gears 30 are pulling the cores 26 thereof from the sleeves 23. This is accomplished since any one of the driving gears 30 rotates the driven gear 35 meshing therewith, as well as the drive shaft 36, and rotation of the drive shaft rotates all of the driven gears 36 which in turn rotate the drive wheels 30 of the de-energized solenoids. When the solenoid is initially energized, the core 26 and the link 28 of that solenoid are substantially in alignment; therefore, little rotary motion will be imparted to the drive gear 30. However, the force will increase rapidly until the pin 29 is at right angles to the vertical axis of the drive gear 30 at which time the full force of the solenoid will be applied. Accordingly, the only time that a single solenoid is in use is when such solenoid is at its maximum pulling force and as the force on that solenoid begins to decrease, the next solenoid will be energized and the decreasing force of one solenoid will be in direct proportion to the increasing force of the next solenoid so that a substantially constant force is applied to the drive shaft 36.

Since the spur-type drive gears 30 are substantially larger than the pinion-type driven gears 35, which are mounted on the drive shaft 36, a substantial mechanical advantage is obtained so that the drive shaft will rotate at a faster speed than the drive gears 30. The amount of mechanical advantage, as well as the speed of rotation of the drive shaft, can be altered by changing the gear ratio between the drive gears 30 and the driven gears 35. Any desired work unit, such as an automobile transmission or the like (not shown), can be connected to the drive shaft 36 in any conventional manner to perform work.

I claim:

1. An electromagnetic motor for converting electrical energy into rotary motion comprising a body, a plurality of electromagnetic means mounted in said body, each of said electromagnetic means having a movable core, each of said cores being swingably connected to one end of independent link means, drive gear means spaced from each of said electromagnetic means, the opposite end of each of said link means being eccentrically pivoted to one of said drive gear means, said drive gear means being rotatably mounted on stub shafts disposed along a common axis, a drive shaft spaced from and generally parallel to the axes of said stub shafts, a plurality of driven gear means fixed to said drive shaft and meshing with said drive gear means, and distributor means associated with said body for sequentially operating said electromagnetic means, whereby at least one of said electromagnetic means is energized at any one time to cause rotation of said driving gear means to drive said driven gear and said drive shaft.

2. The structure of claim 1 in which said distributor means includes a commutator supplied with electrical energy from an exterior source and adapted to sequentially energize said electromagnetic means, and said commutator is mounted on one of said stub shafts.

3. The structure of claim 1 including battery means for supplying electrical energy to said distributor means, an electrical generating unit electrically connected to said battery means, and means for driving said generating unit from said drive shaft, whereby at least part of the electrical energy from said battery means is returned thereto. eccentrically sequential 4. In an electromagnetic motor having solenoid means with a core swingably connected to one end of a link, and means for sequentially energizing said solenoid means: the improvement comprising a plurality of stub shafts disposed along a common axis in spaced relation to said solenoid means, a drive gear mounted on each of said stub shafts, the opposite end of each of said links being eccentrically pivotally connected to one of said drive gears so that operation of said solenoid means will cause rotation of said drive gears, a drive shaft spaced from and generally parallel to the common axis of said stub shafts, a plurality of driven gears fixed to said drive shaft, each of said driven gears meshing with one of said drive gears, whereby sequential operation of said drive gears causes rotation of said drive shaft.

5. The structure of claim 4 in which said means for sequentially operating said solenoid means includes a distributor mounted on one of said stub shafts, said distributor having a commutator having a generally cylindrical periphery, means for conducting electrical energy to a portion of said commutator periphery, a plurality of brushes spaced about said commutator and intimately engaging the periphery thereof, each of said brushes being connected to a separate solenoid means, and means for supplying electrical energy to said commutator, so that rotation of said commutator will sequentially supply electrical energy to said solenoid means.

* * * * *

UNITED STATES PATENT OFFICE
CERTIFICATE OF CORRECTION

Patent No. 3,676,719     Dated July 14, 1972

Inventor(s) Angelo A. Pecci

It is certified that error appears in the above-identified patent and that said Letters Patent are hereby corrected as shown below:

Column 4, Line 22, cancel "eccentrically sequential"

Signed and sealed this 24th day of October 1972.

(SEAL)
Attest:

EDWARD M. FLETCHER, JR.
Attesting Officer

ROBERT GOTTSCHALK
Commissioner of Patents